United States Patent
Runkana et al.

(10) Patent No.: US 9,002,521 B2
(45) Date of Patent: *Apr. 7, 2015

(54) SYSTEM FOR OPTIMIZING AND CONTROLLING PARTICLE SIZE DISTRIBUTION AND FOR SCALE-UP OF NANOPARTICLE PRODUCTION IN AN AEROSOL FLAME REACTOR

(71) Applicants: Venkataramana Runkana, Pune (IN); Venkata Sudheendra Buddhiraju, Pune (IN); Nagaravi Kumar Varma Nadimpalli, Pune (IN)

(72) Inventors: Venkataramana Runkana, Pune (IN); Venkata Sudheendra Buddhiraju, Pune (IN); Nagaravi Kumar Varma Nadimpalli, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/319,818

(22) Filed: Jun. 30, 2014

(65) Prior Publication Data
US 2014/0316576 A1 Oct. 23, 2014

Related U.S. Application Data

(62) Division of application No. 13/180,401, filed on Jul. 11, 2011, now Pat. No. 8,805,586.

(30) Foreign Application Priority Data

Jul. 12, 2010 (IN) .......................... 1984/MUM/2010

(51) Int. Cl.
| | |
|---|---|
| B01J 19/00 | (2006.01) |
| B82Y 30/00 | (2011.01) |
| C01B 13/20 | (2006.01) |
| C01B 33/18 | (2006.01) |
| C01G 23/047 | (2006.01) |
| C01G 23/07 | (2006.01) |

(52) U.S. Cl.
CPC .... B01J 19/0033 (2013.01); Y10T 436/115831 (2015.01); Y10T 436/12 (2015.01); B82Y 30/00 (2013.01); C01B 13/20 (2013.01); C01B 33/18 (2013.01); C01G 23/047 (2013.01); C01G 23/07 (2013.01); C01P 2004/51 (2013.01); C01P 2004/52 (2013.01); C01P 2004/61 (2013.01); C01P 2004/62 (2013.01); C01P 2004/64 (2013.01); C01P 2006/12 (2013.01)

(58) Field of Classification Search
CPC ........ C01B 13/20; C01B 33/18; B82Y 30/00; C01G 23/047; C01G 23/07; C01P 2006/12; C01P 2004/52; C01P 2004/61; C01P 2004/62; C01P 2004/64; C01P 2004/51
USPC ............ 700/266, 268; 702/22, 26, 29, 31, 32; 422/3, 62, 67, 105, 108, 110; 436/50, 436/55; 435/3, 286.1; 73/863.01–863.03, 73/865.5, 861.41; 977/773, 779, 880
See application file for complete search history.

*Primary Examiner* — Shogo Sasaki
(74) *Attorney, Agent, or Firm* — Schmeiser, Olsen & Watts LLP

(57) ABSTRACT

The present invention relates to a system for optimizing and controlling the particle size distribution and scale-up of production of nanoparticle in an aerosol flame reactor. The method provides nanoparticles with desired, optimized and controlled particle size and the specific surface area in aerosol reactors using a simulation tool with programmed instructions. The simulation tool couples flame dynamics model and particle population balance model.

12 Claims, 12 Drawing Sheets

--- PRIOR ART ---

--- PRIOR ART ---

SYSTEM FOR OPTIMIZING AND CONTROLLING PARTICLE SIZE DISTRIBUTION AND FOR SCALE-UP OF NANOPARTICLE PRODUCTION IN AN AEROSOL FLAME REACTOR

CROSS REFERENCE TO RELATED APPLICATION[S]

This application is a divisional of the earlier U.S. Patent Application to Runkana et al., Ser. No. 13/180,401, filed Jul. 11, 2011, which claims priority to Indian Patent Application to Runkana, et al., serial number 1984/MUM/2010, filed Jul. 12, 2010, the disclosures of which are hereby incorporated entirely herein by reference.

FIELD OF INVENTION

The present invention relates to a system and a method for optimizing and controlling the particle size distribution and for scale-up of production of nanoparticles in an aerosol flame reactor. More particularly the present invention relates to a system and a method for optimization of mean particle size, specific surface area, and distribution of nanoparticles in aerosol reactors.

BACKGROUND OF THE INVENTION AND PRIOR ART

In the recent years, nanotechnology has gained importance and has become one of the major research focus areas for its fundamental and practical applications. The smaller size of the particles especially less than 100 nm is one of the key parameters that is responsible for various properties such as electronic, electric, optical, magnetic chemical and mechanical properties that makes nanoparticles suitable for several applications in the fields of ceramics, catalysis, coatings, electronics, chemical and mechanical polishing, data storage, fuel cells, etc.

Many commodity and specialty chemicals and materials such as carbon black, titania, silica and zinc oxide are produced in the form of fine particles, which find applications in a wide variety of industrial and domestic products ranging from tyres, printing inks, paints and pigments, plastics, optical fibers, catalysts, pharmaceutical ingredients and cosmetics.

For many practical applications, it is desirable to have particles of small size as well as of narrow size distribution because smaller particles with narrow size distribution result in better properties of finished products. For example, activity of catalysts, hardness and strength of metals, electrical conductivity of ceramics improve as the particle size decreases.

These special properties of the nanoparticles can vary markedly from those of the analogous bulk materials. The physical and chemical properties of the nanomaterials tend to be exceptionally dependent on their size and shape or morphology. As a result, materials scientists are focusing their efforts on developing simple and effective methods for producing nanomaterials with controlled particle size and morphology and hence, improving their properties.

Many techniques and methods have been employed for the synthesis of nanoparticles on the laboratory scale. Some of the well known methods and systems are as follows:

a) Gas phase synthesis process: It is one of the routinely employed techniques used for large scale production of nano powders, as it is a single step process without any moving parts and any extensive solid-liquid separation processes.

b) Chemical and mechanical routes such as microemulsion-based synthesis and grinding.

Amongst the above mentioned methods and techniques, flame aerosol synthesis is one of the commonly and widely used technologies for synthesis of fine powders on an industrial scale, as it offers many control parameters like flame temperature, flame structure, stoichiometry, pressure level, residence time distribution, turbulence etc.

The typical method of synthesis of nanoparticles in flame aerosol synthesis is as follows:

a) Injecting the precursor or reactant into the reactor in the form of a vapor or liquid using a carrier gas along with air and fuel.

b) Chemical reactions occur in the gas phase in the flame at high temperatures and results in product molecules;

c) Growth of the particles by coagulation and/or surface reaction to form product particles due to decrease in the temperature at downstream in the reactor The temperature decrease at the downstream of the reactor results in the particle growth mainly by coagulation and results in irregularly structured particles and particle distribution.

Further, the powders produced in the aerosol flame reactors have a relatively large particle size and have wide size distribution, with particle size ranging from a few nanometers to micrometers, the wide particle size distribution is influenced by several factors, namely, burner geometry, nature of flame and its configuration, inlet reactant flow rate and its concentration, and turbulence characteristics, gas and particle velocities, pressure and temperature profiles and residence time distribution inside the reactor.

Yet another challenging task lies in scaling up of the process to produce nanoparticles in large quantities, while at the same time maintaining the particle size in the nanometer range.

Hence, there is a need for controlling the product particle size distribution by manipulating and designing the process input variables.

Further, there is also a need for scaling up the process of synthesis of nanoparticles with desired characteristics.

Some of the prior arts that propose a system, method and scale-up process for synthesis of nano-particles are as follows:

U.S. Pat. No. 5,498,446 (Axelbaum et al) teaches a method and apparatus for reacting sodium vapor with gaseous chlorides in a flame to produce nanoscale particles of un-oxidized metals, composites and ceramics. The flame is operated under conditions which lead to condensation of a NaCl by-product onto the particles. The condensate encapsulates the particles and aids in controlling desired particle size and preventing undesirable agglomeration among the particles during synthesis. Following synthesis, oxidation of the particles is inhibited by the encapsulation and handling character of the products is greatly enhanced. Though the '446 patent discloses a method and apparatus for synthesis of nanoparticles, it does not disclose the means for optimization, and controlled particle size distribution of nanoparticles. Further, '446 patent does not address challenging aspect for the scale-up of production of nanoparticles with the desired particle size.

EP 1122212 (Hendrik et al) teaches a method to control particle characteristics of flame made nanostructured powders and investigated at high production rates addressing the required safety concerns. The influence of increasing the fuel and production rate, burner configuration and total oxidant flow on particle size morphology and composition is presented for synthesis of silica in a commercial oxy-hydrogen burner. Hence, the patent application discloses a method to control particle characteristics of flame made nanostructured powders experimentally, which is expensive and time consuming.

"Computational fluid-particle dynamics for the flame synthesis of alumina particles" by Johannessen et al (2000) discloses a mathematical model for the dynamics of particle growth during the synthesis of the ultra fine particles in diffusion flame. The article combines a simple batch model for coagulation and coalescence of aerosol particles along with the computational fluid dynamics model (Fluent) in a decoupled manner to simulate the gas composition, temperature and velocity profiles in a flame reactor and integrate the simple monodisperse population balance (MPB) model along a set of "characteristic trajectories" only and not for the entire flame structure. Further, the article discloses the computational fluid-particle dynamics for the flame synthesis using specific burner with three concentric quartz tubes. Further, the article does not determine the particle characteristics throughout the reactor and does not determine the particle characteristics using various burners and does not address the challenging aspect for the scale-up of production of nanoparticles with the desired particle size. Further, the simple kinetics used in the article only applies for a limited range of temperature and particle size.

Thus, in light of the above mentioned prior arts it is evident that there is a need to have a customizable solution for optimizing and controlling the particle size distribution in a continuous process rather than a batch process and scale-up of production of nanoparticle in an aerosol flame reactor.

Further, there is a need to have a customizable solution to optimize and control the particle size distribution and scale-up of production of nanoparticles in aerosol flame reactor in a coupled manner i.e. by solving the particle dynamics equations in each and every cell of the computational domain.

It is also evident that the process equipment design and scale-up, pilot scale studies are tedious and expensive. Hence, there is growing demand to have a customizable solution for synthesis and scale-up of nanoparticles with desired particle size and shape by improving the process design and scale-up which provides the basic process understanding and dynamic behavior of the flame reactor to reduce the efforts on pilot plant studies for the synthesis of any material.

In the present invention we propose a novel approach for optimizing and controlling the particle size distribution and scale-up of production of nanoparticles in aerosol flame reactor to overcome the above mentioned limitations for synthesis of nanoparticles with controlled particle size, shape and particle size distribution.

In order to address the long felt need for such a solution, the present invention provides a system and method for optimizing and controlling the particle size and scale-up of production of nanoparticles in an aerosol flame reactor, described more particularly herein after.

OBJECTS OF THE INVENTION

The principle object of the invention is to provide a system and method for optimizing and controlling the particle size and specific surface area of nanoparticles in an aerosol flame reactor.

Another object of the invention is to provide a system and method for scaling up the synthesis of nanoparticles in an aerosol flame reactor.

Another object of the invention is to provide cost effective system and method for optimizing and controlling the particle size and specific surface area of nanoparticles in an aerosol flame reactor.

Another object of the invention is to provide cost effective method for scaling up synthesis of nanoparticles in an aerosol flame reactor.

Another object of the invention is to provide system and method which optimizes and controls the particle size and specific surface area of nanoparticles in an aerosol flame reactor requiring less experimentation and utilizing less time.

Another object of the invention is to provide a method for scaling up synthesis of nanoparticles in an aerosol flame reactor which requires less experimentation.

Yet another object of the invention is to provide a simulation tool with programmed instructions for production of nanoparticles with controlled properties.

SUMMARY OF THE INVENTION

The present invention discloses a system and method for optimizing and controlling mean particle size and specific surface area and for scale-up of nanoparticle production in an aerosol flame reactor.

A system for optimizing and controlling mean particle size and specific surface area and for scale-up of nanoparticle production in aerosol flame reactor comprising of:
  an aerosol flame reactor integrated with process instruments, wherein the reactor further comprises of
    at least one burner;
    at least one precursor or reactant fed to the aerosol flame reactor;
    at least one stream input fed along with at least one precursor or reactant to the aerosol flame reactor;
  a simulation tool with programmed instructions to cause the processor to couple flame dynamics model and particle population balance model in order to optimize and control mean particle size and specific surface area and for scale-up of nanoparticle production in aerosol flame reactor.

A method for optimizing and controlling the mean particle size and specific surface area and for scale up of nanoparticle production in an aerosol flame reactor integrated with the process instruments, wherein the method comprises the steps of:
  a) Determining
    i) the operating data for physical process parameters from the process instruments integrated with aerosol flame reactor;
    ii) the mixing characteristics of the precursor or reactant at a particular concentration and the stream input fed to the burner of the aerosol flame reactor with the process instruments;
    iii) the flame temperature and different species mass-fractions throughout the reactor using the Flame dynamics model coupled to the simulation tool with programmed instructions;
    iv) the data for influence of burner configuration and the design of the reactor on the properties of nanoparticles.
  b) Feeding the determined data of step i) to the simulation tool with the programmed instructions to obtain the simulated data for optimizing and controlling the mean particle size and specific surface area and for scale up of nanoparticle production in an aerosol flame reactor integrated with the process instruments;

c) Implementation of the simulated data obtained from the simulation tool with programmed instructions for optimizing and controlling the mean particle size and specific surface area and for scale up of nanoparticle production in an aerosol flame reactor integrated with the process instruments;

d) Estimating the rate kinetics of the precursor oxidation reaction using the precursor to product conversion kinetics coupled to Particle population balance model of the simulation tool with programmed instructions;

e) Obtaining the output as product particle size and specific surface area of the reactor from the simulation tool with the programmed instructions to optimize and control the particle size distribution and for scale up of nanoparticle production in an aerosol flame reactor integrated with the process instruments.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings, exemplary constructions of the invention; however, the invention is not limited to the specific methods disclosed. In the drawings.

DETAILED DESCRIPTION OF THE INVENTION

Before the present method, and hardware enablement are described, it is to be understood that this invention in not limited to the particular methodologies, and hardware described, as these may vary. It is also to be understood that the terminology used in the description is for the purpose of describing the particular versions or embodiments only, and is not intended to limit the scope of the present invention which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are exemplary to the invention, which may be embodied in various forms.

The present invention provides a system for optimizing and controlling particle size distribution and for scale-up of nanoparticle production in an aerosol flame reactor comprising of:

an aerosol flame reactor integrated with process instruments, wherein the reactor further comprises of
at least one burner;
at least one precursor or reactant fed to the aerosol flame reactor;
at least one stream input fed along with at least one precursor or reactant to the aerosol flame reactor;
a simulation tool with programmed instructions to cause the processor to couple flame dynamics model and particle population balance model in order to optimize and control mean particle size and specific surface area and for scale-up of nanoparticle production in an aerosol flame reactor.

According to one of the embodiments of the present invention, the process instruments comprises of precursor flow rate gauze, precursor pressure gauze, air flow rate gauze, air pressure gauze, fuel flow rate gauze, fuel pressure gauze, carrier gas flow rate gauze, carrier gas pressure gauze and temperature sensors.

The process instruments integrated with the aerosol flame reactor provides the operating data for variables such as precursor flow rate, precursor pressure, air flow rate, air pressure, carrier gas flow rate, carrier gas pressure to the simulation tool with programmed instructions to manage the process.

Figure 1:
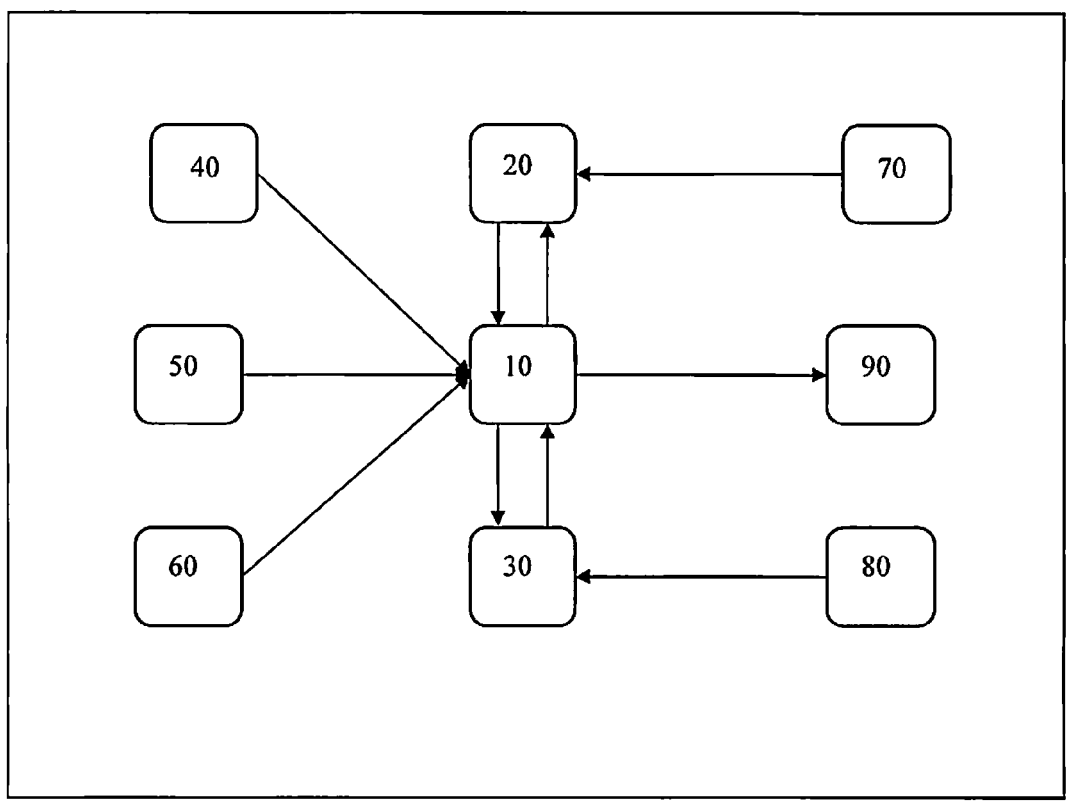
FIG. 1 of the present invention illustrates the structure of the simulation tool with programmed instructions.

FIG. 1 of the present invention illustrates the structure of the simulation tool with programmed instructions.

According to one of the embodiments of the present invention, simulation tool with programmed instructions (10) couples flame dynamics model (20) and particle population balance model (30) to optimize and control the mean particle size and specific surface area and for scale-up of the production of nanoparticles with the desired characteristics.

Flame dynamics model (20) coupled to the simulation tool with programmed instructions determines the flame temperature and different species mass-fractions throughout the reactor and further determines and simulates the physical process parameters such as but not limited to fluid flow rate, heat transfer rate, etc.

Further, the Flame dynamics model (20) is coupled with fuel combustion kinetics (70) for managing operating data obtained from the various process instruments of the aerosol flame reactor.

The governing equations for the flame dynamics model are as follows: The equation of motion according to Bird et al., (2002)

$$\frac{\partial}{\partial t}(\rho u) = -[\nabla \cdot \rho u u] - \nabla p - [\nabla \cdot \tau] - [\nabla \cdot \tau^{(t)}] + \rho g \quad (1)$$

Wherein $\rho$ is gas density (kg/m$^3$), u is velocity (m/s), $\tau^{(t)}$ is turbulent momentum flux tensor (kg/s$^2$/m), $\tau$ is stress tensor (kg/s$^2$/m) and g is gravitational acceleration (m/s$^2$).

Further, as per Launder and Spalding (1974), the k-$\epsilon$ model is used for calculating the turbulent kinetic energy, k (m$^2$/s$^2$) and its dissipation rate, $\epsilon$ (m$^2$/s$^3$)

$$\frac{\partial}{\partial t}(\rho k) + \nabla \cdot (\rho u k) = \nabla \cdot \left[\left(\mu + \frac{\mu_t}{\sigma_k}\right)\nabla k\right] + P_k - \rho \varepsilon \quad (2)$$

$$\frac{\partial}{\partial t}(\rho \varepsilon) + \nabla \cdot (\rho u \varepsilon) = \nabla \cdot \left[\left(\mu + \frac{\mu_t}{\sigma_k}\right)\nabla \varepsilon\right] + \frac{\varepsilon}{k}(C_{\varepsilon 1} P_k - C_{\varepsilon 2} \rho \varepsilon) \quad (3)$$

where $P_k$ is turbulence production due to viscous and buoyancy forces (kg/s$^3$) which is obtained using the following equation:

$$P_k = \mu_t \nabla u \cdot (\nabla u + \nabla u^T) - \frac{2}{3}\nabla \cdot u(3\mu_t \nabla \cdot u + \rho k) + P_{kb} \quad (4)$$

where $\mu_t$ is turbulent viscosity (kg/m/s) given by $$\frac{\rho C_\mu k^2}{\varepsilon}$$

and $P_{kb}$ is turbulence production due to buoyancy forces (kg/s$^3$).

The continuity equation for component i as given by (CFX 11.0 User's Manual):

$$\nabla \cdot (\rho \vec{v} Y_i) = -\nabla \cdot \vec{J}_i + R_i + S_i \quad (5)$$

where $R_i$ is the net rate of production of species i by a chemical reaction, $S_i$ is the rate of creation by addition from the dispersed phase, $Y_i$ is mass fraction of component i and $J_i$ is diffusion flux of species i, which arises due to concentration gradients.

The equation of energy in terms of the specific enthalpy h (J/kg) is given by (CFX 11.0 User's Manual):

$$\frac{\partial}{\partial t}(\rho h) + \nabla \cdot \rho h u = \nabla \cdot (k_g \nabla T) + \frac{\partial p}{\partial t} + u \cdot \nabla p + \tau : \nabla u + S_E \quad (6)$$

where $k_g$ is thermal conductivity of the gas (J/m/s/K), $S_E$ is source term that denotes the rate of heat liberated due to chemical reaction and heat absorption due to radiation. $\tau : \nabla u$ is always negative and is called the viscous dissipation.

The P-1 radiation model according to Siegel and Howell (1992) is incorporated in the enthalpy balance to account for radiant energy absorption and irradiation. The radiation flux is expressed by expanding the radiation intensity in series of orthogonal harmonics in this model. The radiation flux is then directly incorporated into the enthalpy balance to account for the radiation heat transfer process.

The rate of fuel combustion is calculated using the eddy-dissipation model (EDM) proposed by Magnussen and Hjertager (1976). The chemical reaction is fast relative to the transport processes. The fuel combustion model consists of two rate expressions, Equations 7 and 8 given below. Equation 7 represents the reaction rate R$_1$ (kmol/m$^3$/s) that accounts for the mixing of the reactants in the turbulent eddies.

$$R_1 = A_{EDM} \frac{\varepsilon}{k} \min\left(\frac{[I]}{v_I}\right) \quad (7)$$

where [I] (kmol/m$^3$) is concentration of the reactant I, $v_1$ is the stoichiometric coefficient of component I and $A_{EDM}$ is a numerical constant.

Equation 8 represents the reaction rate R$_2$ (kmol/m$^3$/s) that accounts for the mixing of the hot product gases with the cold reactant gases when heat transport to the unreacted gases is the limiting factor.

$$R_2 = A_{EDM} B_{EDM} \frac{\varepsilon}{k}\left(\frac{\sum_P [I] W_I}{\sum_P v_I W_I}\right) \quad (8)$$

where P loops over all product components in the reaction. In Eq.8, W$_1$ (kg/kgmol) is molar mass of the component I and $B_{EDM}$ is a numerical constant. The rate of combustion is determined by the smaller of the two rates R$_1$ and R$_2$.

Particle population balance model (30) coupled to the simulation tool with programmed instructions determines the properties of evolved particles.

The governing equations for particle population balance model (30) are as follows:
The rate of change of particle number concentration (N) is given by:

$$\frac{\partial N}{\partial t} + \frac{\partial u_j N}{\partial x_j} = \frac{\partial}{\partial x_j}\left(\eta \frac{\partial N}{\partial x_j}\right) + I - \frac{1}{2}\beta N^2 \quad (9)$$

where η (m²/sec) is diffusion coefficient, β (m³/sec) is coagulation rate coefficient and I (#/m³-sec) is rate of nucleation (Ji et al., 2007):

$$I = k_n(S-1)^{N_n} \quad (10)$$

where $k_n$ (#·s⁻¹·m³) is nucleation rate constant, S is degree of supersaturation and the exponent $N_n$ is taken as 1. The last term on the RHS of Eq. 9 represents the reduction of particle number concentration N by coagulation. The coagulation rate coefficient β is calculated using the Fuchs equation (Fuchs, 1964; Seinfield, 1986).

$$\beta = 8\pi D r_c \left( \frac{r_c}{2r_c + \sqrt{2}\, t_p} + \frac{\sqrt{2D}}{cr_c} \right) \quad (11)$$

The particle diffusion coefficient D is calculated as given by Johannessen (1999):

$$D = \frac{K_b T}{6\pi \mu r_c} \left[ \frac{5 + 4Kn + 6Kn^2 + 18Kn^3}{5 - Kn + (8+\pi)Kn^2} \right] \quad (12)$$

where Kn is the Knudsen number (λ/$r_c$), λ(m) is the gas mean free path and μ (Pa·s) is viscosity of the gas. The total surface area density of the particles A (m²/m³) decreases by coalescence but remains unaffected by coagulation.

$$\frac{\partial A}{\partial t} + \frac{\partial u_j A}{\partial x_j} = \frac{\partial}{\partial x_j}\left(\eta \frac{\partial A}{\partial x_j}\right) + I a_p - \frac{1}{\tau_f}(A - A_{min}) \quad (13)$$

where $a_p$ is the monomer surface area (m²), $\tau_f$ is characteristic coalescence time (s) and $A_{min}$ is minimal total surface area density, given by:

$$A_{min} = (\pi N)^{1/3}(6V)^{2/3} \quad (14)$$

where V is total particle volume density (m³/m³). The characteristic coalescence time $T_f$ depends on temperature, primary particle size, material, sintering mechanism, etc. Particle coalescence occurs due to a combination of mechanisms, namely, surface diffusion, grain boundary diffusion, solid state diffusion and viscous flow.

The characteristic coalescence time $\tau_f$ of two separate, contacting spherical particles is given by Johannesssen et al. (2000):

$$\tau_f = k_0 d_p^m \frac{T}{T_0} \exp\left(\frac{E_A}{R}\left(\frac{1}{T} - \frac{1}{T_0}\right)\right) \quad (15)$$

where $E_A$ is activation energy, $d_p$ is initial diameter of the two primary contacting spherical particles in an aggregate, $k_0$ is pre-exponential term, $T_0$ is temperature and R is universal gas constant.

The total particle volume density V (m³/m³) increases by nucleation and chemical reaction.

$$\frac{\partial V}{\partial t} + \frac{\partial u_j V}{\partial x_j} = \frac{\partial}{\partial x_j}\left(\eta \frac{\partial V}{\partial x_j}\right) + I v_p + S_V \quad (16)$$

where $v_p$ is the monomer volume (m³) and $S_V$ is rate of increase of total particle mass per unit volume of the system (kg/m³·s), given by the following equation:

$$S_V = (\pi/2) A G \rho \quad (17)$$

where G is total growth rate of a particle (m/s). The total growth rate G under the combined control of chemical reaction and mass transfer is calculated as $$G = \frac{G_M G_C}{G_M + G_C} \quad (18)$$

where $G_M$ is growth rate of a particle under the control of mass transfer (m/s) and $G_C$ is growth rate of a particle under the control of chemical reaction kinetics (m/s). The linear growth rate of a particle under the control of mass transfer $G_M$ (m/s) is given by:

$$G_M = 4 V_{mol} D_{A-O_2} \frac{1.013 \times 10^5}{8.314 T d_n} Y_A^*(S-1) \quad (19)$$

where $V_{mol}$ is molar volume of the product molecule produced (m³/mol): $TiO_2$, $SiO_2$ or Carbon black, $D_{A-O_2}$ is diffusion coefficient of A (product molecule) through $O_2$ (m²/s), S is degree of supersaturation, $d_n$ is number-averaged particle size (m), $Y^*_A$ is mole fraction of A at saturation temperature T. The growth rate of a particle under the control of chemical reaction kinetics, $G_C$ is given by the following expression:

$$G_C = k_{gc}(S-1)^{N_g} \quad (20)$$

where $k_{gc}$ is particle growth rate constant (m/s). The exponent $N_g$ is assumed to be 1. When S≤1, $G_C$ is set equal to zero.

Particle population balance model (30) determines the properties of the evolved particles on the basis of the above discussed equations for particle number concentration, particle volume and particle surface area.

Particle population balance model (30) is further coupled to precursor to product conversion kinetics (80) for monitoring and controlling the particle size distribution of nanoparticles and further estimates the rate kinetics of the precursor oxidation reaction.

The combined eddy dissipation-finite rate chemistry model available in CFX 11.0 represents the oxidation of precursor to product molecules. The rate of oxidation is taken as the minimum of the rates obtained using the Arrhenius expression, given below, and the eddy dissipation model (Eqs. 7 and 8).

$$R_A = A \exp\left(\frac{-E}{RT}\right) C_{precursor} C_{O_2} \quad (21)$$

where A is pre-exponential factor, E (J/kmol-K) is activation energy, $C_{precursor}$ (kmol/m³) is the concentration of the precursor, $C_{O_2}$ (kmol/m³) is concentration of oxygen and R (J·kmol⁻¹·K⁻¹) is the universal gas constant.

In one of the embodiments of the present invention, the simulation tool with programmed instructions is developed on a FORTRAN platform to simulate and determine the physical processes.

Nanoparticles with desired particle size and shape are produced in the aerosol flame reactors on provision of the various optimized operating conditions (40) such as but not limited to flame temperature, pressure, optimum gas flow rate, and reactant or precursor concentrations.

The values for various optimized operating conditions are provided to the simulation tool with the programmed instructions so as to simulate and determine the influence of these various operating parameters on the particle size and specific surface area of the nanoparticles.

Further, according to another embodiment of the present invention, the geometry and design (50) of the reactor and burner also influences the particle size, particle size distribution and shape of the nanoparticles. The various sizes of burners, the number of concentric tubes of the burner, the spacing between each tube, diameter of the tubes of the burner are fed to the simulation tool with the programmed instructions so as to simulate and determine the influence of the variable geometry and design of the burner and reactor on the particle size.

Further according to one of the embodiments of the present invention, the burners are designed and configured for various stream inputs to the aerosol flame reactor.

Further according to one of the embodiments of the present invention the burner geometry is designed and implemented in co-ordination with the simulation tool with programmed instructions in terms of number of concentric tubes, diameters of each tube and spacing between each tube.

According to another embodiment of the present invention the various characteristics and properties of the physical constants and materials (60) are fed to the simulation tool with the programmed instructions so as to simulate and determine the influence of the characteristics and properties of the materials (60) on the particle size distribution.

The simulation tool with the programmed instructions provides output (90) as product particle size and specific surface area of the reactor.

Figure 2:
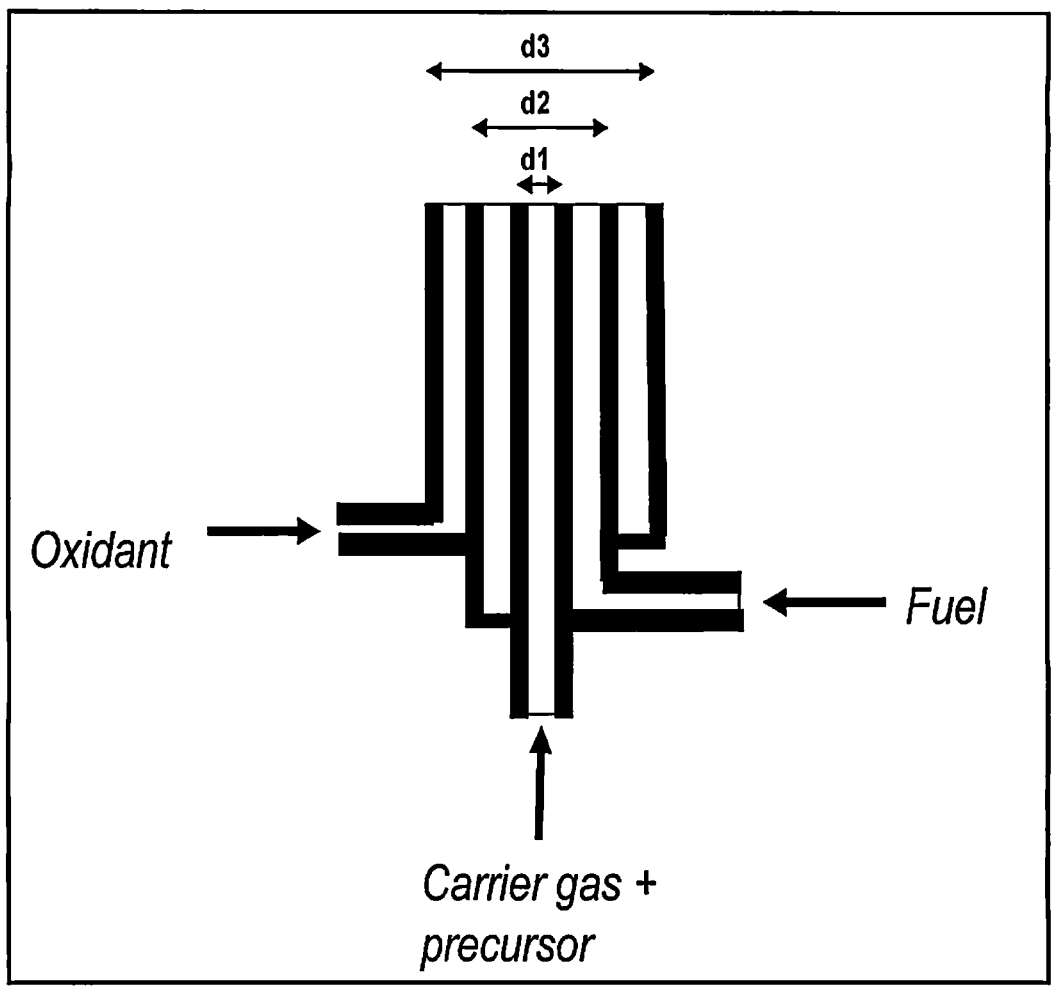
FIG. 2 illustrates the typical diffusion flame burner.

FIG. 2 of the present invention illustrates the typical diffusion flame burner, wherein carrier gas along with precursor or reactant is injected through the centre tube; fuel is injected through the second tube and oxidant through the third tube; wherein the diameter of centre tube, second tube and third tube are represented by d1, d2 and d3 respectively.

According to one of the embodiments of the present invention, the simulation tool with programmed instructions of the present invention determines the influence of the three burners with varying diameters of the central tube, the annulus and the outer tube, for scale-up of production of nanoparticles. The inner diameter of the central tube (d1) can be in the range 1.5-5.5 mm, the inner diameter of the outer most tube (d3) can range from 5 mm to 25 mm while the inner diameter of the tube in between the central and outer tubes (d2) could be in the range 3 mm-12 mm.

Figure 3:
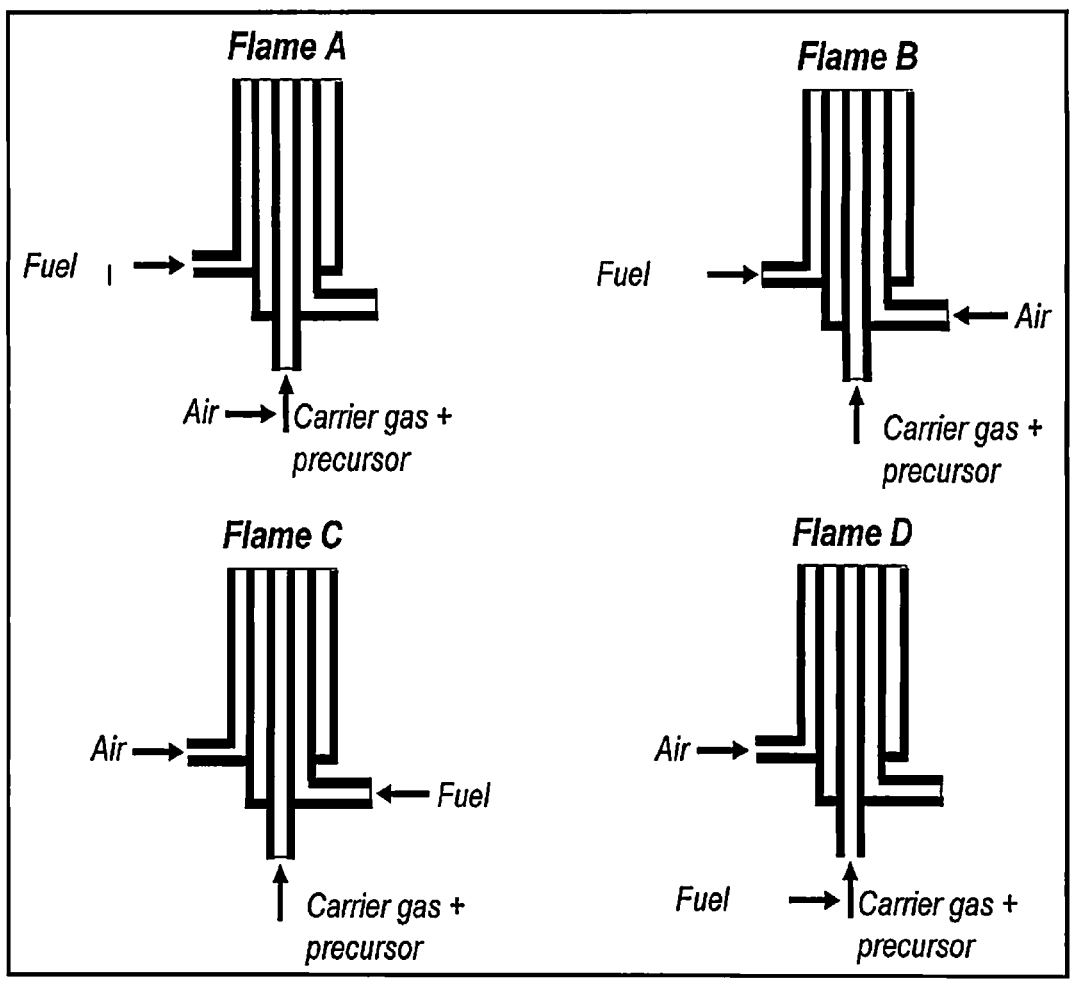
FIG. 3 illustrates the typical aerosol flame burner configurations (Source of figure: T. Johannessen, S. E. Pratsinis and H. Livbjerg, Computational fluid-particle dynamics for the flame synthesis of alumina particles, Chemical Engineering Science, 55, 177-191 (2000)).

FIG. 3 of the present invention illustrates the typical aerosol flame burner configurations according to Johannssen et al., (2000).

According to one of the embodiments, four typical aerosol flame reactor burner configurations are illustrated in FIG. 3 with respect to the various modes of stream inputs.

Flame A illustrates the injection of carrier gas along with precursor and air from the centre tube and fuel through the third tube, whereas no stream input is provided through the second tube.

Flame B illustrates the injection of carrier gas along with precursor from the centre tube and air through the second tube while fuel through the third tube.

Flame C illustrates the injection of carrier gas along with precursor from the centre tube and fuel through the second tube while air through the third tube.

Flame D illustrates the injection of carrier gas along with precursor and fuel from the centre tube and air through the third tube, whereas no stream input is provided through the second tube.

Any of the four typical aerosol flame reactor burner configuration values and geometries as illustrated in FIG. 3 can be fed to the simulation tool with programmed instructions of the present invention to simulate, and determine the influence of the burner configuration and geometries on the particle size distribution in the aerosol flame reactor.

EXAMPLES OF WORKING OF THE INVENTION

The invention is described in the examples given below which is provided only to illustrate the invention and therefore should not be construed to limit the scope of the invention.

Example 1

Figure 4:
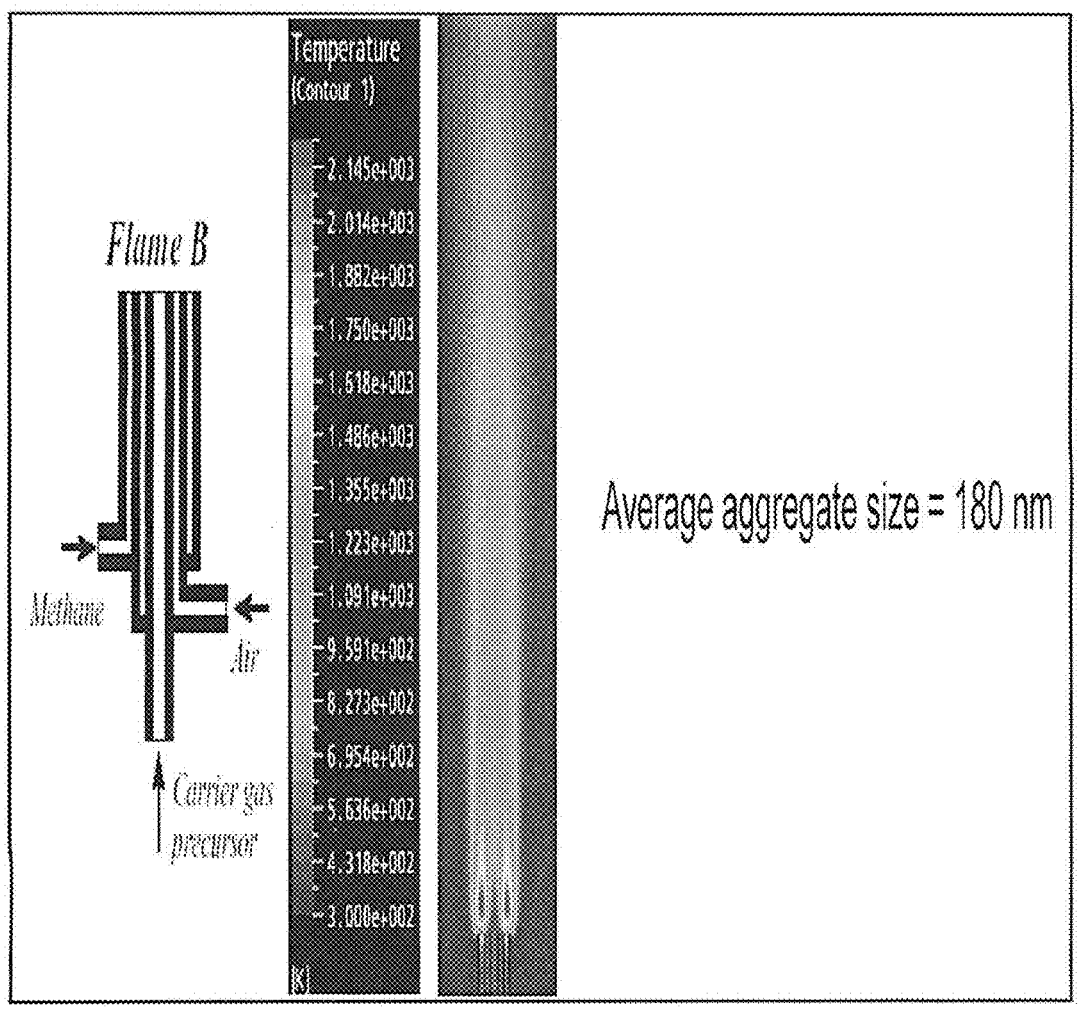
FIG. 4 illustrates the temperature contours and the value of the alumina aggregate particle size inside the flame reactor with burner configuration B (Source for Flame B figure: T. Johannessen, S. E. Pratsinis and H. Livbjerg, Computational fluid-particle dynamics for the flame synthesis of alumina particles, Chemical Engineering Science, 55, 177-191 (2000)).

FIG. 4 shows the temperature contours and the value of the alumina aggregate particle size inside the flame reactor with burner configuration B (Flame B) of FIG. 3, wherein methane in the input stream is fed to the burner through the third tube; air in the second tube and precursor and carrier gas in the first tube.

The configuration of input streams (methane, air, carrier gas and precursor) to the burner has a strong influence on the flame characteristics and hence on the particle size. The influence of burner configuration and arrangement of the burner configurations on flame temperature profile is shown in FIG. 4.

The flames in configuration B (FIG. 4) are shorter flames surrounded by air on both sides and hence, yield a more efficient combustion.

Example 2

Figure 5:
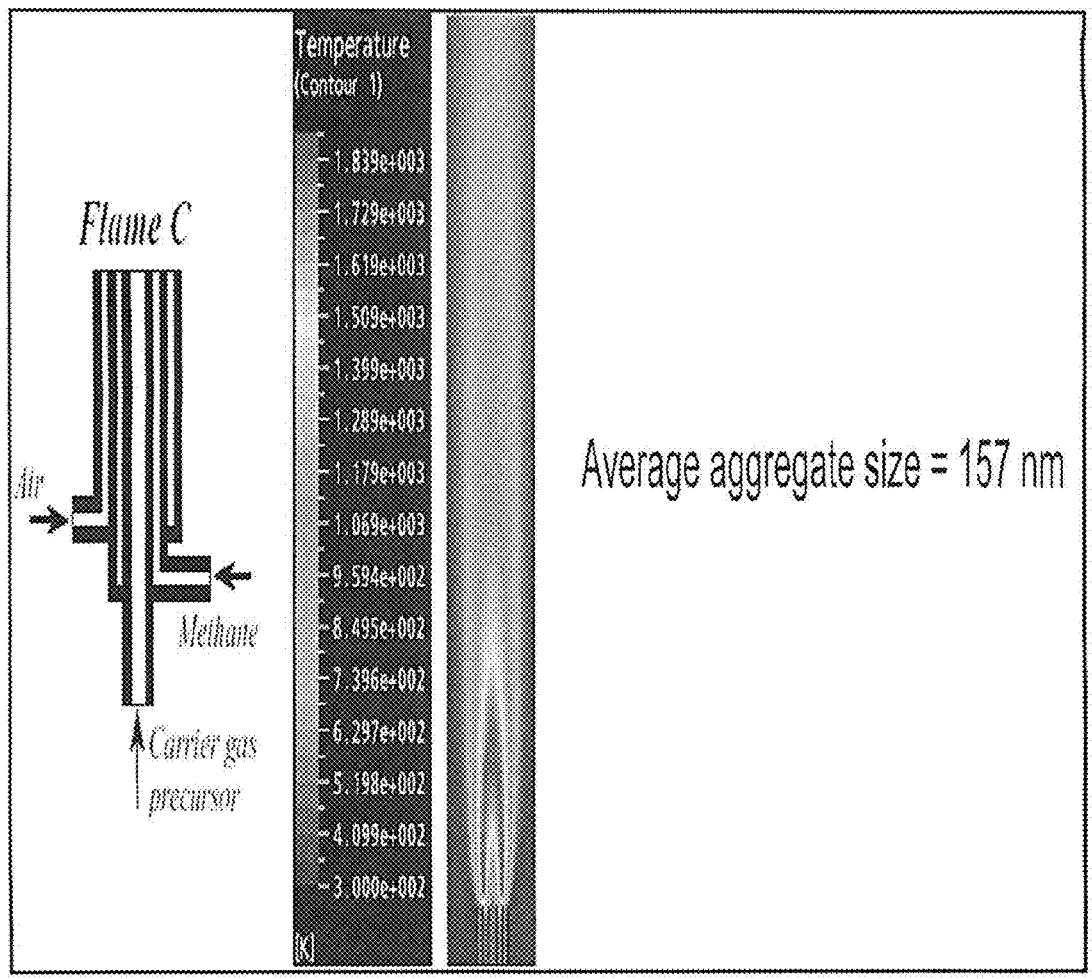
FIG. 5 illustrates the temperature contours and the value of the alumina aggregate particle size inside the flame reactor with burner configuration C (Source for Flame C figure: T. Johannessen, S. E. Pratsinis and H. Livbjerg, Computational fluid-particle dynamics for the flame synthesis of alumina particles, Chemical Engineering Science, 55, 177-191 (2000)).

FIG. 5 shows the temperature contours and the value of the alumina aggregate particle size inside the flame reactor with burner configuration C (Flame C) of FIG. 3, wherein methane in the input stream is fed to the burner through the second tube; air in the third tube and precursor and carrier gas in the first tube.

The configuration of input streams to the burner has a strong influence on the flame characteristics and hence on the particle size. The influence of burner configuration on flame temperature profile is shown in FIG. 5.

The configuration B (flame B) has methane in the third tube and air in the second tube where as configuration C has methane in the second tube and air in the third tube. This difference in arrangement alters the flame shape and size drastically as seen in the FIGS. 4 and 5.

The flames in configuration B (FIG. 4) are surrounded by air on both sides and hence, yield a more efficient combustion than those in configuration C.

For this reason, flames in configuration B are shorter than those in configuration C (FIG. 5), with slightly higher temperatures than the latter.

Example 3

Figure 6:
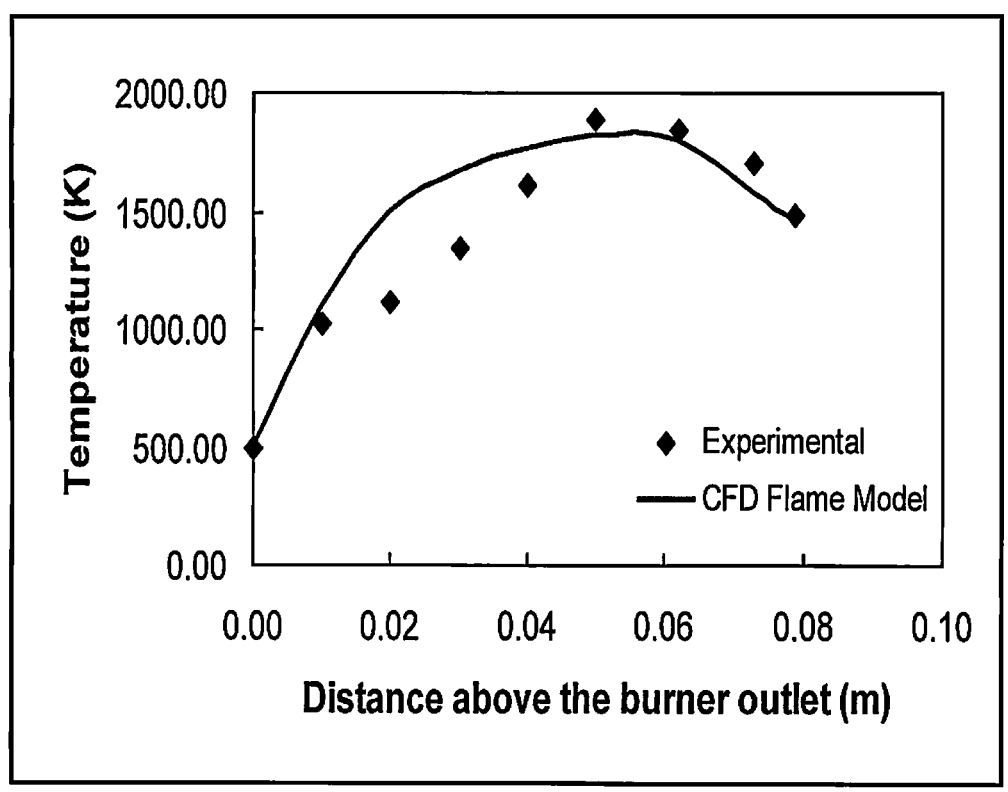
FIG. 6 illustrates the comparison of axial temperature profile in a laboratory scale flame reactor determined by simulation tool of the present invention with the experimental data of Johanessen et al (T. Johannessen, S. E. Pratsinis and H. Livbjerg, Computational fluid-particle dynamics for the flame synthesis of alumina particles, Chemical Engineering Science, 55, 177-191 (2000)).

FIG. 6 illustrates the comparison of axial temperature profile in a laboratory scale flame reactor determined by simulation tool of the present invention with the experimental data of Johanessen et al (T. Johannessen, S. E. Pratsinis and H. Livbjerg, Computational fluid-particle dynamics for the flame synthesis of alumina particles, Chemical Engineering Science, 55, 177-191 (2000)).

FIG. 6 compares the data determined by the simulation tool with programmed instructions for the axial temperature profile and influence of distance above burner outlet (m) on the mean particle size with that of published experimental data of Johanessen et al (2000).

Further, Table 1 below provides and compares the simulated data determined by the simulation tool with programmed instructions for the axial temperature profile and influence of distance above burner outlet (m) on the mean particle size with that of published experimental data of Johanessen et al (2000).

TABLE 1

| Distance above burner outlet | Temperature (K) | |
|---|---|---|
| (m) | Experimental | Simulated |
| 0.00 | 500 | 500 |
| 0.01 | 1018 | 1091 |
| 0.02 | 1117 | 1493 |
| 0.03 | 1342 | 1672 |
| 0.04 | 1608 | 1764 |
| 0.05 | 1887 | 1816 |
| 0.06 | 1842 | 1796 |
| 0.07 | 1698 | 1572 |
| 0.08 | 1486 | 1462 |

It can be noticed that the data determinations made by the simulation tool of the present invention are relatively close to the experimental measurements and thereby indicating the accuracy of the data determinations made by the simulation tool of the present invention.

Example 4

Figure 7:
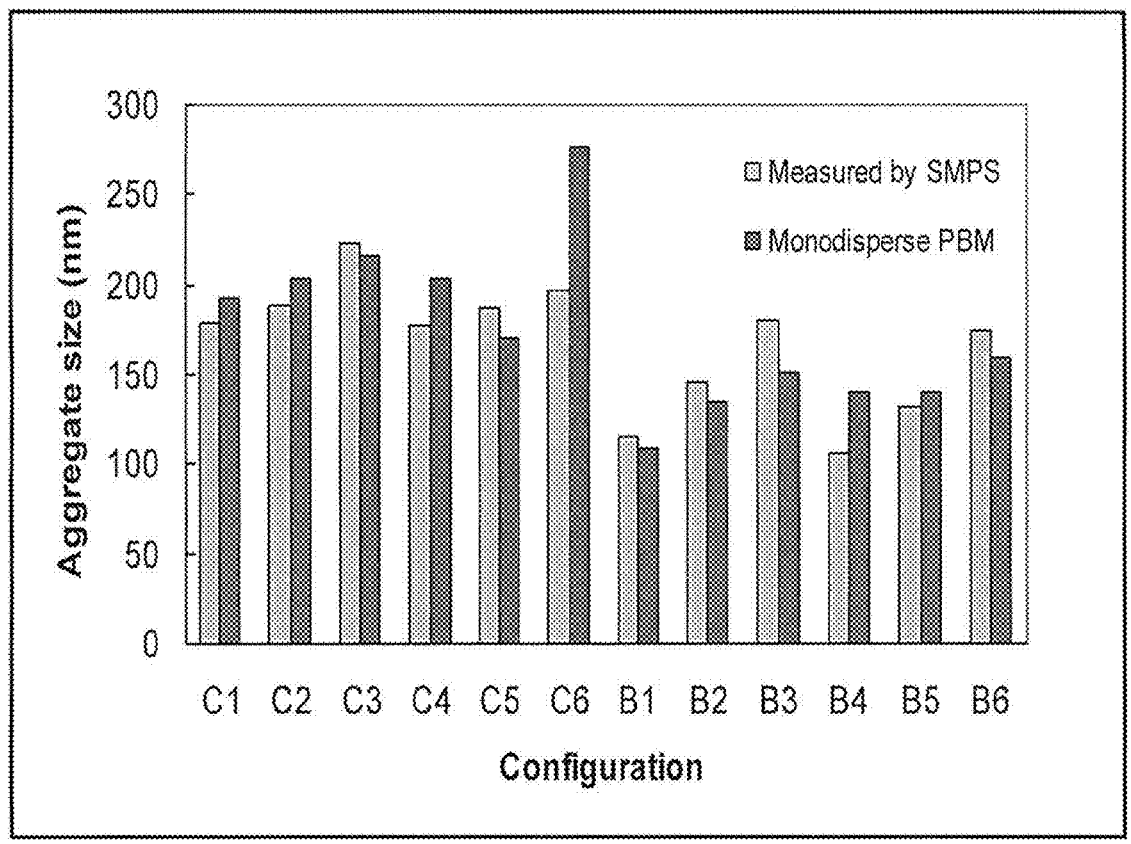
FIG. 7 illustrates the comparison of alumina aggregate particle sizes determined by simulation tool of the present invention with the experimental data of Johanessen et al (T. Johannessen, S. E. Pratsinis and H. Livbjerg, Computational fluid-particle dynamics for the flame synthesis of alumina particles, Chemical Engineering Science, 55, 177-191 (2000)).

FIG. 7 illustrates the comparison of alumina aggregate particle sizes determined by simulation tool of the present invention with the experimental data of Johanessen et al (T. Johannessen, S. E. Pratsinis and H. Livbjerg, Computational fluid-particle dynamics for the flame synthesis of alumina particles, Chemical Engineering Science, 55, 177-191 (2000)). Further, FIG. 7 compares the data determined by the simulation tool with programmed instructions for the various burner configurations and average particle size with that of published experimental data of Johanessen et al (2000).

Further, Table 2 below provides and compares the data determined and provided by simulation tool with programmed instructions i.e. simulated data for the various burner configurations and average particle size with that of published experimental data of Johanessen et al (2000).

TABLE 2

| | Average particle size (nm) | |
|---|---|---|
| Configuration | Experimental | Simulated |
| C1 | 179 | 193 |
| C2 | 188 | 204 |
| C3 | 223. | 216 |
| C4 | 176. | 203 |
| C5 | 187. | 171 |
| C6 | 196. | 276 |
| B1 | 115. | 109 |
| B2 | 146. | 135 |
| B3 | 180. | 151 |

TABLE 2-continued

| | Average particle size (nm) | |
|---|---|---|
| Configuration | Experimental | Simulated |
| B4 | 106. | 140 |
| B5 | 132. | 141 |
| B6 | 174. | 160 |

It can be noticed that the data determinations made by the tool of the present invention are relatively close to the experimental measurements and thereby indicating the accuracy of the data determined by the simulation tool of the present invention.

Example 5

Figure 8:
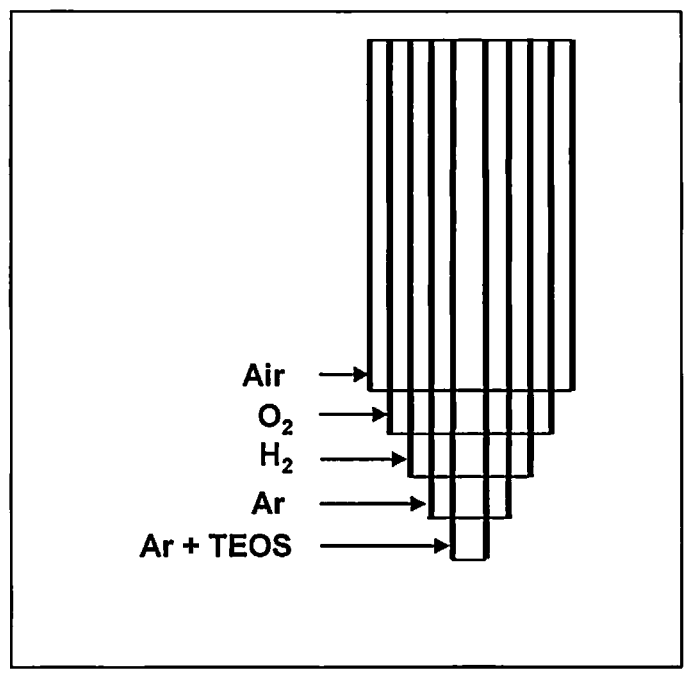
FIG. 8 illustrates the burner configuration with five concentric tubes for silica nanoparticles synthesis from Jang et al (H. D. Jang, 2001, "Experimental study of synthesis of silica nanoparticles by a bench-scale diffusion flame reactor", Powder Technol., 119, 102-108).

FIG. 8 illustrates the burner configuration with five concentric tubes for silica nanoparticles synthesis from Jang et al (H. D. Jang, 2001, "Experimental study of synthesis of silica nanoparticles by a bench-scale diffusion flame reactor", Powder Technol., 119, 102-108).

FIG. 8 shows that the simulation tool of the present invention was tested further for production of silica nanoparticles using a burner with five concentric tubes, wherein Ar and TEOS (precursor) was fed through the centre tube of the burner, Ar was fed through the second tube, $H_2$ was fed through the third tube, $O_2$ was fed through the fourth tube and air was fed through the fifth tube.

Example 6

Figure 9:
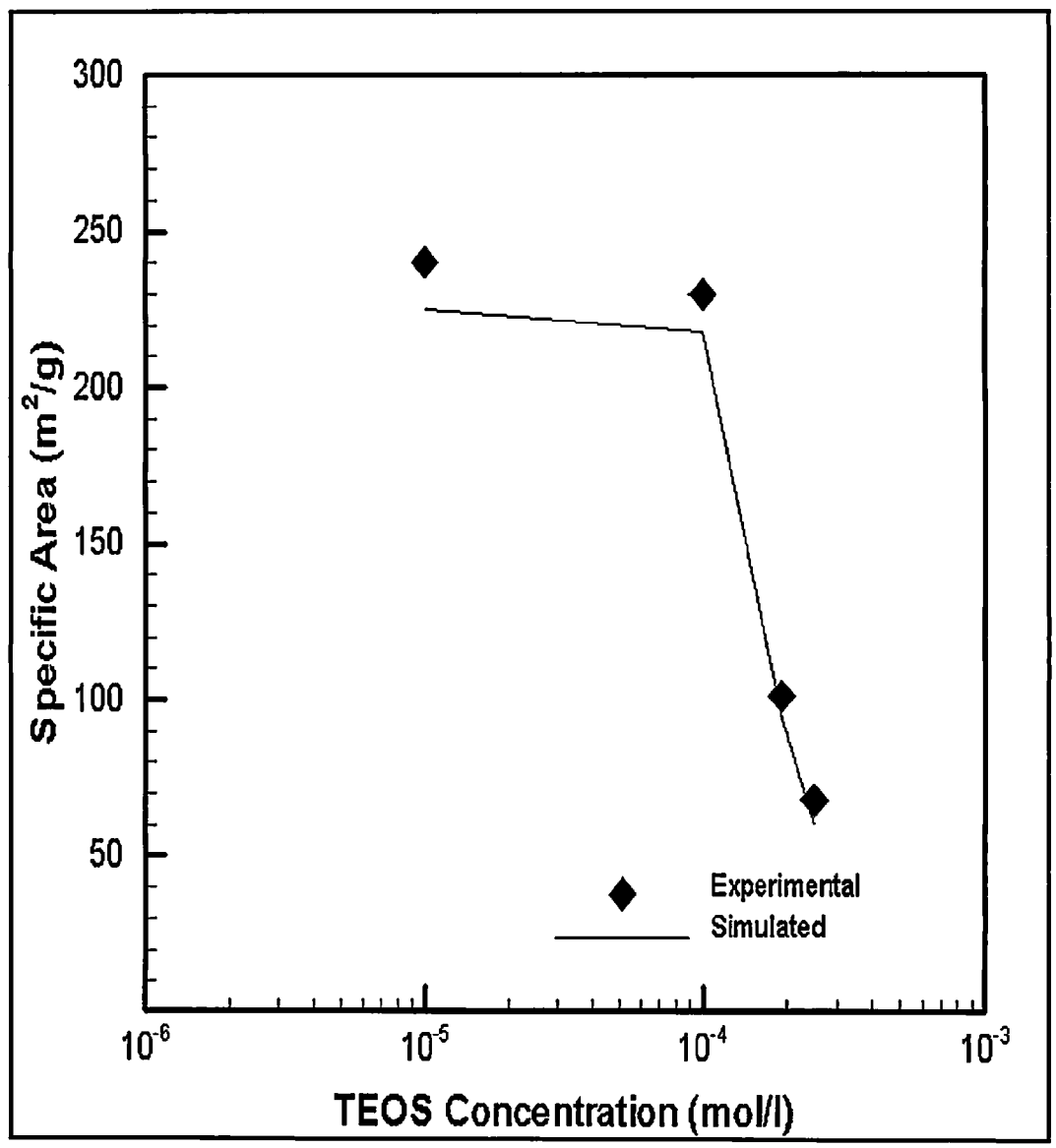
FIG. 9 illustrates the effect of TEOS (precursor) concentration on silica particle specific surface area and compares the data determined by the simulation tool of the present invention with the experimental data from Jang et al (H. D. Jang, 2001, "Experimental study of synthesis of silica nanoparticles by a bench-scale diffusion flame reactor", Powder Technol., 119, 102-108).

FIG. 9 illustrates the effect of TEOS (precursor) concentration on silica particle specific surface area and compares the data determined by the simulation tool of the present invention with the experimental data from Jang et al (H. D. Jang, 2001, "Experimental study of synthesis of silica nanoparticles by a bench-scale diffusion flame reactor", Powder Technol., 119, 102-108).

The burner configuration of FIG. 8 was integrated with the simulation tool of present invention, to determine the specific surface areas of silica particles at different precursor concentrations and compared with published experimental data from Jang et al (2001) in FIG. 9.

FIG. 9 illustrates the effect of TEOS (precursor) concentration on silica particle specific surface area and compares the data determined by the simulation tool of the present invention with the experimental data from Jang et al (2001). Further, Table 3 below provides and compares the effect of TEOS (precursor) concentration on silica particle specific surface area and the data determined and obtained by the simulation tool i.e. simulated data of the present invention with the experimental data from Jang et al (2001).

TABLE 3

| TEOS Concentration | Specific surface area ($m^2/g$) | |
|---|---|---|
| (l/min) | Experimental | Simulated |
| 1.00E−05 | 240 | 225 |
| 1.00E−04 | 230 | 218 |
| 1.91E−04 | 101 | 94 |
| 2.50E−04 | 68 | 60 |

It can be observed that the trend determined by the simulation tool of the present invention is in close agreement with the experimental measurements, further indicating the accuracy of the data determined by the simulation tool of the present invention.

Further, the simulation tool with programmed instructions of the present invention was used to determine the influence of the three burners with varying diameters of the central tube, the annulus and the outer tube, for scale-up of production of nanoparticles. The inner diameter of the central tube (d1) can be in the range 1.5-5.5 mm, the inner diameter of the outer most tube (d3) can range from 5 mm to 25 mm while the inner diameter of the tube in between the central and outer tubes (d2) could be in the range 3 mm-12 mm.

The precursor and fuel flow rates were kept constant and the oxidant flow rate was varied in order to obtain the operating line of particle size versus fuel to oxidant velocity difference with different burner designs.

Few key examples are demonstrated here for the synthesis of titanium dioxide, silica and carbon black. The data determined by the simulation tool of the present invention are compared with published experimental data for validation of the methodology developed in the present invention.

Example 7

Figure 10:
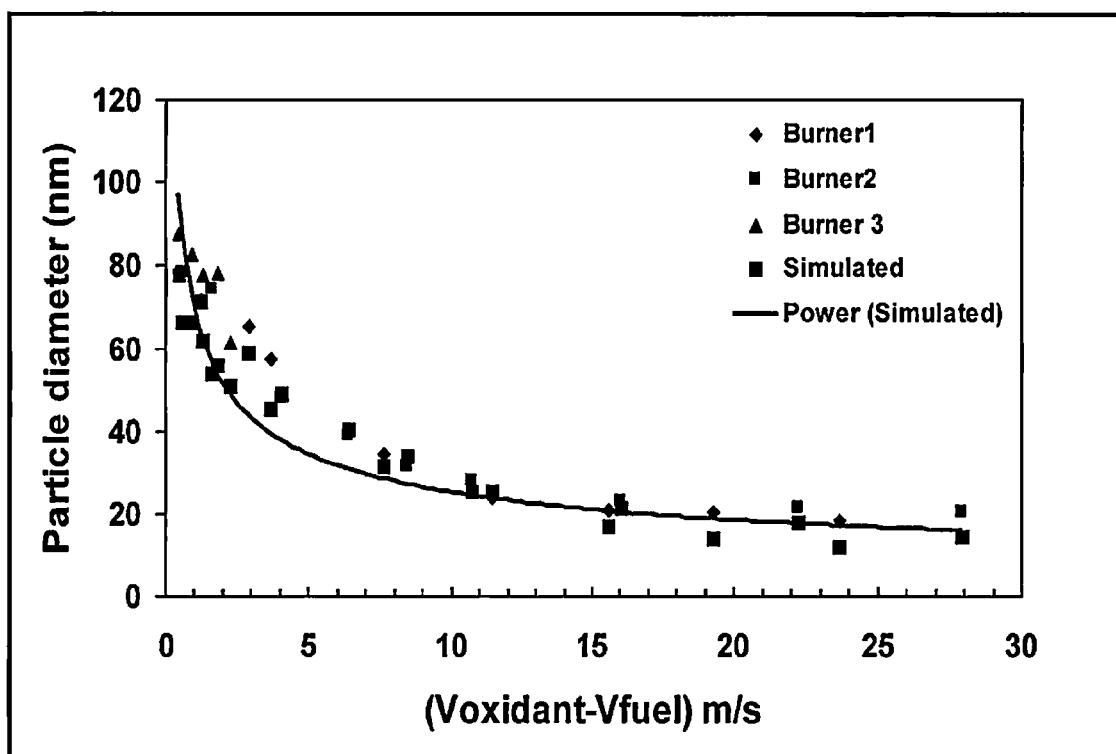
FIG. 10 illustrates Titanium dioxide particle diameter as a function of oxygen and fuel velocity difference with different burner designs and compares the data determined by the simulation tool of the present invention with the experimental data from Wegner and Pratsinis (K. Wegner and S. E. Pratsinis, Scale-up of nanoparticle synthesis in diffusion flame reactors, Chemical Engineering Science, 58(20), 4581-4589 (2003)).

FIG. 10 illustrates Titanium dioxide particle diameter as a function of oxygen and fuel velocity difference with different burner designs and compares the data determined by the simulation tool of the present invention with the experimental data from Wegner and Pratsinis (K. Wegner and S. E. Pratsinis, Scale-up of nanoparticle synthesis in diffusion flame reactors, Chemical Engineering Science, 58(20), 4581-4589 (2003)).

According to one of the exemplary embodiments of the invention, FIG. 10 illustrates that particle size and specific surface area are key product characteristics during the scale-up of the nanoparticle production. In order to verify and validate the simulation tool of the present invention, the data determined by present invention tool for different burner designs that lead to different production rates were simulated.

These simulation results are compared with published experimental data from Wegner and Pratsinis (2003) in FIG. 10 for scale-up of Titania production.

Further, Table 4 below provides and compares the data determined and obtained by the simulation tool i.e. simulated data for particle size and specific surface areas during the scale-up of the titania nanoparticle production of the present invention with the experimental data from Wegner and Pratsinis (2003).

TABLE 4

| Burner Type | Velocity difference ($\Delta V = V_{oxidant} - V_{fuel}$) (m/s) | Particle diameter (dp) (nm) | |
|---|---|---|---|
| | | Experimental | Simulated |
| Burner 1 | 71.9298 | 1.2366 | 70.9840 |
| | 65.2047 | 2.9032 | 58.5689 |
| | 57.3099 | 3.6559 | 45.5512 |
| | 34.2105 | 7.6344 | 31.4976 |
| | 23.9766 | 11.4516 | 25.6017 |
| | 20.7602 | 15.5914 | 16.9228 |
| | 20.1754 | 19.2473 | 13.7482 |
| | 18.421 | 23.6559 | 11.7024 |
| Burner 2 | 0.59140 | 78.3626 | 66.0397 |
| | 1.6129 | 73.9766 | 53.7126 |
| | 4.0860 | 47.6608 | 48.6079 |
| | 6.3979 | 38.5965 | 40.1970 |
| | 8.4409 | 31.2865 | 33.7597 |

TABLE 4-continued

| Burner Type | Velocity difference ($\Delta V = V_{oxidant} - V_{fuel}$) (m/s) | Particle diameter (dp) (nm) | |
|---|---|---|---|
| | | Experimental | Simulated |
| | 10.7527 | 28.0702 | 25.4969 |
| | 16.0215 | 23.09941 | 21.3075 |
| | 22.2580 | 21.3450 | 17.9738 |
| | 27.9570 | 20.4678 | 14.6581 |
| Burner 3 | 0.48387 | 87.4269 | 77.6398 |
| | 0.9140 | 82.4561 | 66.0369 |
| | 1.2903 | 77.7778 | 61.6103 |
| | 1.8280 | 78.3626 | 55.5556 |
| | 2.2580 | 61.4035 | 51.0270 |

It can be observed that the trend determined by the simulation tool of the present invention in scale-up trials for titania particle production is in close agreement with the experimental measurements for scale-up trials of K. Wegner and S. E. Pratsinis, further indicating the accuracy of the data determined by the simulation tool of the present invention.

Example 8

Figure 11:
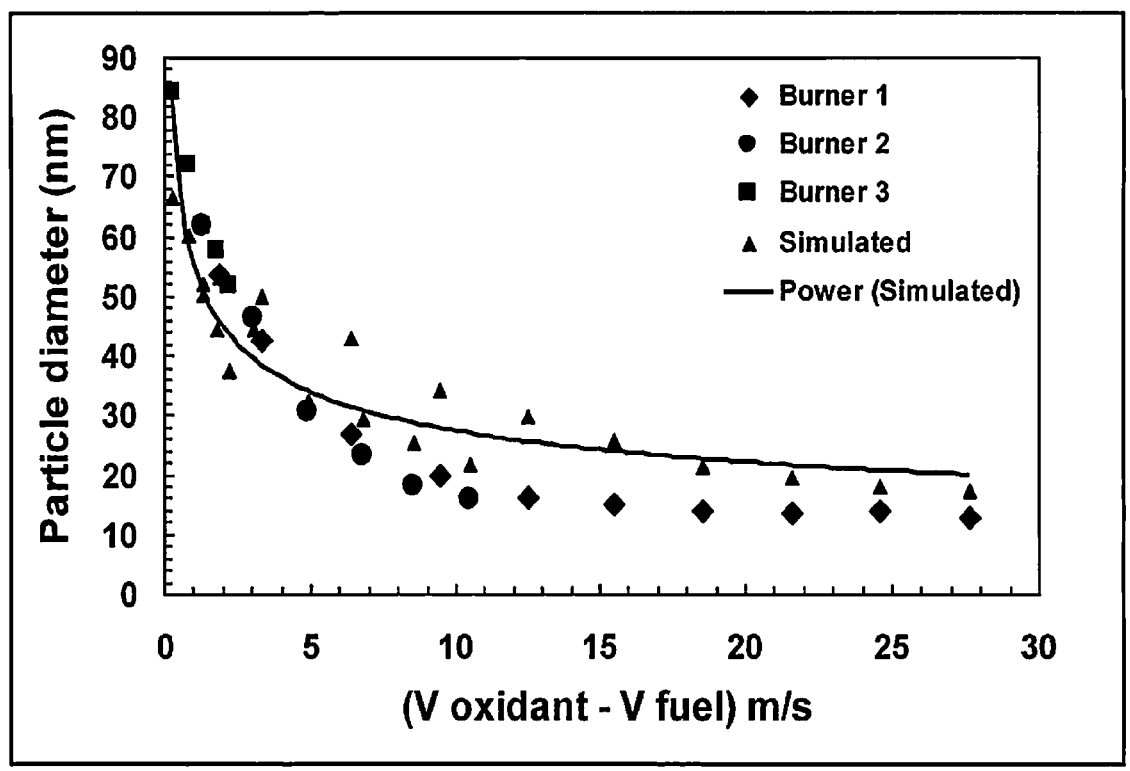
FIG. 11 illustrates Silica particle diameter as function of oxygen and fuel velocity difference with different burner designs and compares the data determined by the simulation tool of the present invention with the experimental data from Wegner and Pratsinis (K. Wegner and S. E. Pratsinis, Scale-up of nanoparticle synthesis in diffusion flame reactors, Chemical Engineering Science, 58(20), 4581-4589 (2003)).

FIG. 11 illustrates Silica particle diameter as function of oxygen and fuel velocity difference with different burner designs and compares the data determined by the simulation tool of the present invention with the experimental data from Wegner and Pratsinis (K. Wegner and S. E. Pratsinis, Scale-up of nanoparticle synthesis in diffusion flame reactors, Chemical Engineering Science, 58(20), 4581-4589 (2003)).

According to one of the exemplary embodiments of the invention, FIG. 11 illustrates that particle size and specific surface area are key product characteristics during the scale-up of the nanoparticle production. In order to verify and validate the simulation tool of the present invention, the data determined by present invention tool for different burner designs that lead to different production rates were simulated.

These simulation results are compared with published experimental data from Wegner and Pratsinis (2003) in FIG. 11 for scale-up of Silica particle production.

Further, Table 5 below provides and compares the data determined and obtained by the simulation tool i.e. simulated data for particle size and specific surface areas during the scale-up of the silica nanoparticle production of the present invention with the experimental data from Wegner and Pratsinis (2003).

TABLE 5

| Burner Type | Velocity difference ($\Delta V = V_{oxidant} - V_{fuel}$) (m/s) | Particle diameter (dp) (nm) | |
|---|---|---|---|
| | | Experimental | Simulated |
| Burner 1 | 1.8987 | 53.6873 | 53.3431 |
| | 3.3635 | 42.7729 | 49.9199 |
| | 6.4014 | 26.8437 | 42.9147 |
| | 9.4394 | 19.7640 | 34.1374 |
| | 12.4774 | 16.2242 | 29.8594 |
| | 15.5154 | 15.0442 | 25.6395 |
| | 18.5533 | 13.8643 | 21.4307 |
| | 21.5913 | 13.5693 | 19.4750 |
| | 24.5750 | 13.8643 | 17.8405 |
| | 27.6130 | 12.9794 | 17.2361 |
| Burner 2 | 1.3020 | 61.6519 | 50.4210 |
| | 3.0380 | 46.3127 | 44.4037 |
| | 4.9367 | 30.3835 | 32.1954 |
| | 6.7812 | 23.0088 | 29.4649 |

TABLE 5-continued

| Burner Type | Velocity difference ($\Delta V = V_{oxidant} - V_{fuel}$) (m/s) | Particle diameter (dp) (nm) | |
|---|---|---|---|
| | | Experimental | Simulated |
| | 8.5714 | 17.9941 | 25.2198 |
| | 10.4702 | 15.6342 | 21.6056 |
| Burner 3 | 0.2712 | 84.0708 | 66.4055 |
| | 0.8137 | 71.9764 | 60.2579 |
| | 1.3020 | 61.6519 | 52.0373 |
| | 1.7902 | 57.5221 | 44.5560 |
| | 2.2242 | 51.6224 | 37.3804 |

It can be observed that the trend determined by the simulation tool of the present invention in scale-up trials for silica particle production is in close agreement with the experimental measurements for scale-up trials of K. Wegner and S. E. Pratsinis, further indicating the accuracy of the data determined by the simulation tool of the present invention. Further, it is evident that upon maintaining the same outlet conditions, silica particles of same size can be produced irrespective of the size of the burner used Example 9

Figure 12:
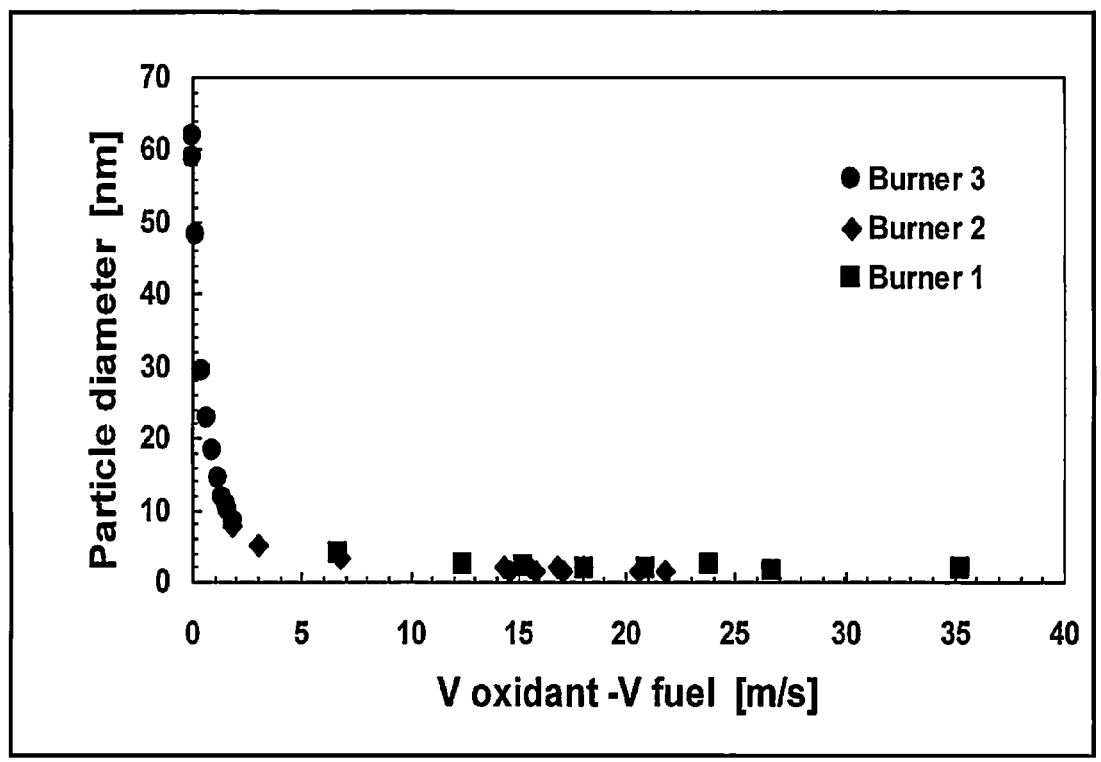
FIG. 12 illustrates the influence of the different burner designs on the velocities of the oxidant and the fuel on carbon black particle size.

FIG. 12 illustrates the influence of the different burner designs on the velocities of the oxidant and the fuel on carbon black particle size.

According to one of the exemplary embodiment of the invention, Acetylene is used both as a precursor and as the fuel while oxygen was used as oxidant in this process. It is partially oxidized and upon using the heat liberated during oxidation, the remaining acetylene cracks into carbon black and hydrogen gas. The influence of the difference in the velocities of the oxidant and the fuel on carbon black particle size is shown in FIG. 12.

Further, Table 6 below provides the data obtained by the simulation tool i.e. simulated data for determining the influence of the difference in the velocities of the oxidant and the fuel on carbon black particle size.

TABLE 6

| Burner Type | Velocity difference ($\Delta V = V_{oxidant} - V_{fuel}$) (m/s) | Particle diameter (dp) (nm) |
|---|---|---|
| Burner 1 | 1.8987 | 53.6873 |
| | 3.3635 | 42.7729 |
| | 6.4014 | 26.8437 |
| | 9.4394 | 19.7640 |
| | 12.4774 | 16.2242 |
| | 15.5154 | 15.0442 |
| | 18.5533 | 13.8643 |
| | 21.5913 | 13.5693 |
| | 24.5750 | 13.8643 |
| | 27.6130 | 12.9794 |
| Burner 2 | 1.3020 | 61.6519 |
| | 3.0380 | 46.3127 |
| | 4.9367 | 30.3835 |
| | 6.7812 | 23.0088 |
| | 8.5714 | 17.9941 |
| | 10.4702 | 15.6342 |
| Burner 3 | 0.2712 | 84.0708 |
| | 0.8137 | 71.9764 |
| | 1.3020 | 61.6519 |
| | 1.7902 | 57.5221 |
| | 2.2242 | 51.6224 |

The results indicate the validity of the simulation tool of the present invention for determining the operating line of particle size versus difference in velocities of the oxidant and the fuel.

Since it was possible to reproduce the operating line for different materials with reasonable accuracy, the simulation tool of the present invention can be utilized for detailed process design and process optimization to produce nanoparticles at different levels of production.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

Advantages of the Invention

Provides a system and method for optimizing and controlling the particle size distribution of nanoparticles.
Provides a system and method for scale-up of production of nanoparticles with desired properties.
Provides cost effective and time saving method and system for optimizing and controlling the particle size distribution and scale-up of production of nanoparticles.
Reduces the number of trials or experiments to be conducted for scale-up, if not avoid them completely.
Provides details about the internal condition of the process equipment and insight into the phenomena that occur during the process.

We claim:

1. A system for optimizing and controlling properties of nanoparticles, wherein the properties comprises a mean particle size and a specific surface area of the nanoparticles for a scale up of nanoparticle production, the system comprises:
an aerosol flame reactor;
process instruments;
a memory; and
a processor coupled to the flame reactor and to the process instruments, the processor executes programmed instructions stored in the memory for performing the steps of:
determining
a) operating data for physical process parameters of a precursor or a reactant from the process instruments;
b) mixing characteristics of the precursor or the reactant at a particular concentration and a stream input fed to a burner of the aerosol flame reactor;
c) a flame temperature, different species mass-fractions, particle size and specific surface area throughout the aerosol flame reactor using a flame dynamics model coupled to a continuous particle population balance model, wherein the coupling between the flame dynamics model and the continuous particle population balance model is achieved by solving of the particle population balance equations in each and every cell of a computational domain/flame structure using the outputs from the flame dynamics model;
d) data for showing influence of the burner and a design of the aerosol flame reactor on the properties of the nanoparticles;
feeding the operating data, burner design parameters, a burner configuration, properties data, and the determined data to a simulation tool with programmed instructions to obtain simulated flame dynamics data;

feeding the simulated flame dynamics data from the flame dynamics model to the continuous population balance model to obtain the mean particle size and the specific surface area of the nanoparticles by the solving particle of the population balance equations in the each and every cell of the computational domain/flame structure; and processing the mean particle size and the specific surface area of the nanoparticles for optimizing and controlling the mean particle size and the specific surface area and for the scale up of the nanoparticle production in the aerosol flame reactor by dynamically changing any one or more of the operating data, the burner design parameters and/or the burner configuration.

2. The system of claim 1, wherein the nanoparticles are of materials comprising one of titanium dioxide, silicon dioxide, carbon black, aluminum oxide, and zinc oxide.

3. The system of claim 1, wherein simulated flame dynamics data comprises temperature, pressure or velocity and chemical composition of the gaseous phase in each and every cell of the computational domain.

4. The system of claim 1, wherein the process instruments comprise a precursor flow rate gauge, a precursor pressure gauge, an air or oxidant flow rate gauge, an air or oxidant pressure gauge, a carrier gas flow rate gauge, a carrier gas pressure gauge, a fuel flow rate gauge, a fuel pressure gauge, and temperature sensors.

5. The system of claim 1, wherein the process instruments provide the operating data for physical process parameters including a precursor flow rate, a precursor pressure, an air or oxidant flow rate, an air or oxidant pressure, a fuel flow rate, a fuel pressure, a carrier gas flow rate, a carrier gas pressure to the simulation tool.

6. The system of claim 1, wherein the continuous particle population balance model comprises equations for rate of change of particle number concentration, rate of change of total surface area density of particles, rate of change of total volume density of particles, and incorporates kinetics of coagulation and coalescence or sintering of particles.

7. The system of claim 1, wherein the continuous particle population balance model is further coupled with precursor to product conversion kinetics module for monitoring and controlling the particle size distribution of nanoparticles.

8. The system of claim 1, wherein the processor further controls the burner ignition and thereby controlling the flame in the aerosol flame reactor.

9. The system of claim 1, wherein the burner is designed and configured for various stream inputs to the aerosol flame reactor.

10. The system of claim 1, wherein the burner configuration comprises a plurality of concentric tubes each having a diameter of at least 1-25 nm, and wherein the plurality of concentric tubes have at least 1 mm spacing between one another.

11. The system of claim 1, wherein the precursor or reactant comprises of materials comprising at least one of titanium tetrachloride, silicon tetrachloride, or acetylene either in liquid or vapor form.

12. The system of claim 1, wherein the stream input fed along with the precursor or reactant comprises at least a carrier gas, an oxidant or air, and a fuel.

* * * * *